US012734484B2

(12) United States Patent
Kimura et al.

(10) Patent No.: US 12,734,484 B2
(45) Date of Patent: Sep. 15, 2026

(54) ADSORBENT, METHOD FOR MANUFACTURING THE SAME, ADSORPTION SHEET, ARTIFICIAL DIALYSIS MEMBRANE, AND ARTIFICIAL DIALYZER

(71) Applicant: Murata Manufacturing Co., Ltd., Nagaokakyo (JP)

(72) Inventors: Yuki Kimura, Nagaokakyo (JP); Ichitaro Okamura, Nagaokakyo (JP); Takeshi Torita, Nagaokakyo (JP); Masashi Koyanagi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 585 days.

(21) Appl. No.: 18/348,151

(22) Filed: Jul. 6, 2023

(65) Prior Publication Data

US 2023/0347290 A1 Nov. 2, 2023

Related U.S. Application Data

(63) Continuation of application No. PCT/JP2022/002442, filed on Jan. 24, 2022.

(30) Foreign Application Priority Data

Jan. 29, 2021 (JP) ................................ 2021-013645

(51) Int. Cl.
*B01D 61/24* (2006.01)
*B01J 20/04* (2006.01)
(Continued)

(52) U.S. Cl.
CPC ............ *B01D 61/243* (2013.01); *B01J 20/04* (2013.01); *B01J 20/28035* (2013.01);
(Continued)

(58) Field of Classification Search
CPC .............. B01D 61/243; B01D 2257/40; B01D 71/028; B01D 61/24; B01J 20/04;
(Continued)

(56) References Cited

U.S. PATENT DOCUMENTS 10,573,768 B2 2/2020 Ghidiu et al.
11,296,243 B2 4/2022 Ghidiu et al.
(Continued)

FOREIGN PATENT DOCUMENTS

CN 107001051 A 8/2017
CN 108245682 A 7/2018
(Continued)

OTHER PUBLICATIONS

Alhabeb et al., "Guidelines for Synthesis and Processing of Two-Dimensional Titanium Carbide (Ti3C2Tx MXene)," Chemistry of Materials, 2017, vol. 29, pp. 7633-7644.
Chen et al., "Pristine Titanium Carbide MXene Films with Environmentally Stable Conductivity and Superior Mechanical Strength," Advanced Functional Materials, 2020, vol. 30, 9 pages.
(Continued)

*Primary Examiner* — Anthony J Zimmer
*Assistant Examiner* — Jaanzeb C Raja
(74) *Attorney, Agent, or Firm* — ArentFox Schiff LLP

(57) ABSTRACT

An adsorbent that includes a particle of a layered material that contains one or a plurality of layers; and contains Li. The one or plural layers includes a layer body represented by: $M_mX_n$ where, M represents at least one Group-3, -4, -5, -6, or -7 metal, X represents a carbon atom, a nitrogen atom, or a combination thereof, n is 1 to 4, and m is larger than n, and equal to or less than 5; and a modified/terminal part T resides on a surface of the layer body, T represents at least one selected from the group consisting of hydroxy group, fluorine atom, chlorine atom, oxygen atom, and hydrogen atom, the modified/terminal part T residing on a surface of
(Continued)

the layer body, the particle has an average thickness of 1 nm to 10 nm, and the adsorbent has a Li content of 0.0001% by mass to 0.0020% by mass.

17 Claims, 4 Drawing Sheets

(51) Int. Cl.
*B01J 20/28* (2006.01)
*B01J 20/30* (2006.01)
*B01J 20/32* (2006.01)

(52) U.S. Cl.
CPC ....... *B01J 20/3071* (2013.01); *B01J 20/3221* (2013.01); *B01D 2257/40* (2013.01)

(58) Field of Classification Search
CPC .............. B01J 20/28035; B01J 20/3071; B01J 20/3221; B01J 20/0211; B01J 20/06; B01J 20/20; B01J 20/28004; B01J 20/02; B01J 20/28; B01J 20/30; B01J 39/10; C01B 32/921
See application file for complete search history.

(56) References Cited

U.S. PATENT DOCUMENTS

| | | | | |
|---|---|---|---|---|
| 12,015,092 | B2 | 6/2024 | Ghidiu et al. | |
| 2014/0162130 | A1* | 6/2014 | Barsoum | C01B 32/914 429/231.8 |
| 2017/0294546 | A1 | 10/2017 | Ghidiu et al. | |
| 2020/0176619 | A1 | 6/2020 | Ghidiu et al. | |
| 2022/0181507 | A1 | 6/2022 | Ghidiu et al. | |
| 2025/0015209 | A1 | 1/2025 | Ghidiu et al. | |

FOREIGN PATENT DOCUMENTS

| | | | | |
|---|---|---|---|---|
| CN | 108793167 | A | 11/2018 | |
| CN | 111151304 | A | 5/2020 | |
| CN | 111785534 | A | * 10/2020 | H01G 11/30 |
| JP | 2017076739 | A | 4/2017 | |

OTHER PUBLICATIONS

International Search Report in PCT/JP2022/002442, mailed Apr. 5, 2022, 3 pages.
Meng et al., “MXene Sorbents for Removal of Urea from Dialysate: A Step toward the Wearable Artificial Kidney,” ACS Nano, 2018, vol. 12, pp. 10518-10528.

* cited by examiner 3a
1a
5a
7a
10a 3a
1a
5a
7a
Δd
3b
1b
5b
7b
10b

ADSORBENT, METHOD FOR MANUFACTURING THE SAME, ADSORPTION SHEET, ARTIFICIAL DIALYSIS MEMBRANE, AND ARTIFICIAL DIALYZER

CROSS REFERENCE TO RELATED APPLICATIONS

The present application is a continuation of International application No. PCT/JP2022/002442, filed Jan. 24, 2022, which claims priority to Japanese Patent Application No. 2021-013645, file Jan. 29, 2021, the entire contents of each of which are incorporated herein by reference.

TECHNICAL FIELD

The present disclosure relates to an adsorbent, a method for manufacturing the same, an adsorption sheet, an artificial dialysis membrane, and an artificial dialyzer.

BACKGROUND ART

MXene has recently attracted attention as a novel material. MXene is a kind of so-called two-dimensional material, which is a layered material having a monolayer or multilayer form as described later. MXene usually has a form of a particle of such layered material (also referred to as MXene particle which may include powder, flake, or nanosheet).

There is ongoing research on various applications of MXene, including with electronic devices and medical instruments. For example, Non-Patent Document 1 describes use of MXene for urea removal by dialysis, wherein MXene was obtained by etching with HF. Non-Patent Document 2 describes that interlayer Li content of MXene was controllable, by adjusting pH of a suspension resulted from Li intercalation to approximately 2.9, typically by adding hydrochloric acid. Non-Patent Document 3 describes delamination of multilayer MXene, using TMAOH (tetramethylammonium hydroxide) as a dispersant, in place of Li.

Non Patent Document 1: Fayan Meng et al., MXene Sorbents for Removal of Urea from Dialysate: A Step toward the Wearable Artificial Kidney, ACS Nano 2018, 12, 10518-10528

Non Patent Document 2: Hongwu chen et al., Pristine Titanium Carbide MXene Films with Environmentally Stable Conductivity and Superior Mechanical Strength, Adv. Funct. Mater., 2020, 30, 1906996

Non Patent Document 3: Mohamed Alhabeb et al., Guidelines for Synthesis and Processing of Two-Dimensional Titanium Carbide (Ti3C2Tx MXene), Chem. Mater., 2017, 29, 7633-7644

SUMMARY

Urea removal by artificial dialysis using MXene has been used in these years as described in Non-Patent Document 1. The prior technique is, however, not fully sufficient in terms of performance of urea adsorption. MXene disclosed in Non-Patent Documents 2 and 3 is not originally aimed at removing urea by artificial dialysis, so that such MXene, if intended for use in urea removal by dialysis, will be desired to suppress as possible Li, TMAOH, or any other substance harmful to kidney disease patients.

According to a first gist of the present invention, provided is an adsorbent comprising: a particle of a layered material that contains one or a plurality of layers; and Li, the one or the plurality of layers including a layer body represented by:

$$M_mX_n$$

where, M represents at least one Group-3, -4, -5, -6, or -7 metal,

X represents a carbon atom, a nitrogen atom, or a combination thereof, n is 1 to 4, and m is larger than n, and equal to or less than 5; and a modified/terminal part T resides on a surface of the layer body, and T represents at least one selected from the group consisting of hydroxy group, fluorine atom, chlorine atom, oxygen atom, and hydrogen atom, the particle has an average thickness of 1 nm to 10 nm, and the adsorbent has a Li content of 0.0001% by mass to 0.0020% by mass.

According to another gist of the present invention, provided is a method for manufacturing an absorbent, the method comprising:

(a) preparing a precursor represented by:

$$M_mAX_n$$

where, M represents at least one Group-3, -4, -5, -6, or -7 metal,

X represents a carbon atom, a nitrogen atom, or a combination thereof,

A represents at least one Group-12, -13, -14, -15, or -16 element, n is 1 to 4, and m is larger than n, and equal to or less than 5;

(b1) etching the precursor using an etching solution so as to remove at least a part of atoms A from the precursor to obtain an etched product;

(c1) washing the etched product with water to obtain a water-washed product;

(d1) conducting Li intercalation including a process of mixing the water-washed product with a Li-containing compound to obtain a Li-intercalated product;

(e) conducting delamination including a process of stirring the Li-intercalated product to obtain a delaminated product;

(f) conducting acid treatment including a process of mixing the delaminated product with an acid solution to obtain an acid-treated product; and (g) washing the acid-treated product with water to obtain the adsorbent, the adsorbent having a Li content of 0.0001% by mass to 0.0020% by mass.

According to the present disclosure, there is provided an adsorbent that contains a particle of a predetermined layered material (also referred to as "MXene", in this specification), and Li, wherein the particle has an average thickness of 1 nm to 10 nm, and a Li content of 0.0001% by mass to 0.0020% by mass. This successfully provides an adsorbent that contains MXene, and excels in adsorption performance.

According to the present disclosure, there is also provided a method for manufacturing an adsorbent, the method comprising: (a) preparing a predetermined precursor; (b1) etching the precursor using an etching solution so as to remove at least a part of atoms A from the precursor; (c1) washing, with water, an etched product obtained by the etching; (d1) conducting Li intercalation including a process of mixing a water-washed product obtained by the water washing, with a Li-containing compound; (e) conducting delamination including a process of stirring a Li-intercalated product obtained by the Li intercalation; (f) conducting acid treatment including a process of mixing a delaminated product obtained by the delamination, with an acid solution; and (g) washing, with water, an acid-treated product obtained by the acid treatment. This successfully provides an adsorbent that contains the particle and the aforementioned amount of Li, shaped as described above, and typically excels in adsorption performance of polar organic compound.

BRIEF DESCRIPTION OF THE DRAWINGS

FIG. 1A illustrates a monolayer MXene, and FIG. 1B illustrates a multilayer (exemplified by double-layer) MXene;

DETAILED DESCRIPTION

First Embodiment 1: Adsorbent

Figures 1A, 1B:
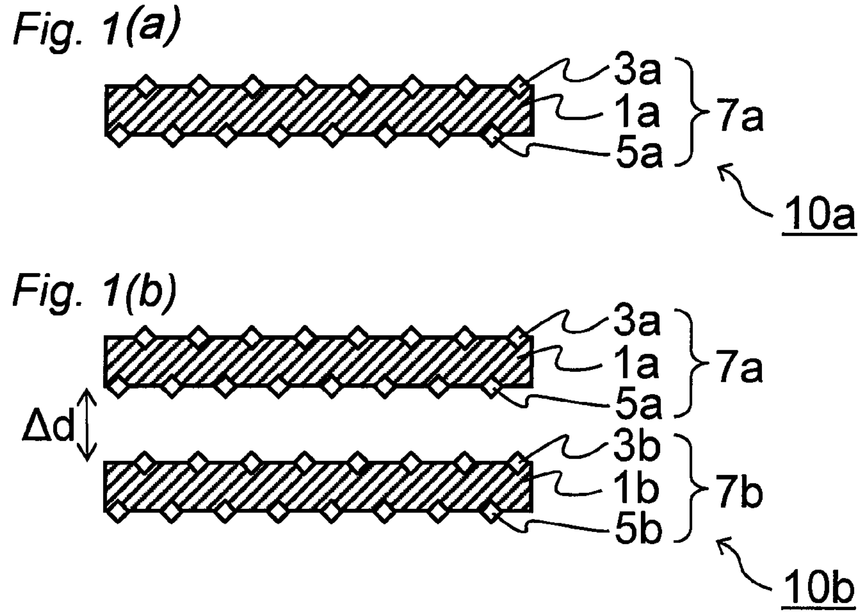
FIGS. 1A and 1B are schematic cross-sectional views illustrating MXene as a layered material applicable to the adsorbent of the present disclosure, where

An adsorbent in one embodiment of the present invention will be detailed below, without restricting the present disclosure to the embodiment.

The adsorbent of this embodiment comprises a particle of a layered material that contains one or a plurality of layers; and Li, the one or the plurality of layers including a layer body represented by:

$M_mX_n$ where, M represents at least one Group-3, -4, -5, -6, or -7 metal,

X represents a carbon atom, a nitrogen atom, or a combination thereof, n is 1 to 4, and m is larger than n, and equal to or less than 5; and a modified/terminal part T resides on a surface of the layer body, and T represents at least one selected from the group consisting of hydroxy group, fluorine atom, chlorine atom, oxygen atom, and hydrogen atom, the particle has an average thickness of 1 nm to 10 nm, and the adsorbent has a Li content of 0.0001% by mass to 0.0020% by mass.

The layered material may be understood as a layered compound, and is also denoted "$M_mX_nT_s$", where s represents any number, which might have been x or z in the prior notation. Typically, but not restrictively, n represents 1, 2, 3, or 4.

In the above formula of MXene, M preferably represents at least one selected from the group consisting of Ti, Zr, Hf, V, Nb, Ta, Cr, Mo, and Mn, and more preferably represents at least one selected from the group consisting of Ti, V, Cr, and Mo.

MXene, represented by such formula $M_mX_n$, has been known by those below:

$Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti,V)_2C$, $(Ti,Nb)_2C$, $W_2C$, $W_{1.3}C$, $Mo_2N$, $Nb_{1.3}C$, $MO_{1.3}Y_{0.6}C$ (where "1.3" and "0.6" mean approximately 1.3(=4/3) and approximately 0.6(=2/3), respectively);

$Ti_3C_2$, $Ti_3N_2$, $Ti_3(CN)$, $Zr_3C_2$, $(Ti, V)_3C_2$, $(Ti_2Nb)C_2$, $(Ti_2Ta)C_2$, $(Ti_2Mn)C_2$, $Hf_3C_2$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$;

$Ti_4N_3$, $V_4C_3$, $Nb_4C_3$, $Ta_4C_3$, $(Ti,Nb)_4C_3$, $(Nb,Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, $(W_2Hf_2)C_3$, $(Mo_{2.7}V_{1.3})C_3$ (where, "2.7" and "1.3" means approximately 2.7(=8/3) and approximately 1.3(=4/3), respectively).

Typically, M in the formula above may represent titanium or vanadium, and X may represent a carbon atom or a nitrogen atom. For example, the MAX phase is given by $Ti_3AlC_2$, and MXene is given by $Ti_3C_2T_s$ (in other words, M represents Ti, X represents C, m represents 3, and n represents 2).

In the present disclosure, MXene may contain a relatively small amount of residual atom A, which typically amounts 10% by mass or less of the original content of atom A. The residual content of atom A may preferably be 8% by mass or less, and may more preferably be 6% by mass or less. The residual content of atom A, even exceeding 10% by mass, would however be of no problem in some cases, depending on applications and use conditions of the adsorbent.

The adsorbent of this embodiment contains Li, but only to a suppressed degree. Li is ascribable to an intercalator used for Li intercalation. In the adsorbent of this embodiment, Li can exist as a Li ion, while being intercalated between layers of MXene, and/or, supported outside the layers. The adsorbent of the present embodiment contains Li, with the content thereof controlled to 0.0001% by mass to 0.0020% by mass. With the Li content suppressed to 0.0020% by mass or less, the adsorbent of this embodiment will have excellent biocompatibility if used, for example, for artificial dialysis. More specifically, the adsorbent can achieve a safety factor that is 27.2 times as large as the upper limit value of the blood Li level, which will be evaluated later in Examples. The Li content is measured by ICP-AES, on the basis of inductively coupled plasma emission spectroscopy. The adsorbent of this embodiment, with the Li content thus suppressed as described above, is usable typically as an adsorbent for a separation membrane in artificial dialysis. MXene has a fixed adsorption capacity per unit volume typically for urea. The adsorbent of this embodiment, in which the content of any unnecessary intercalator (Li in this case) is suppressed to an extremely low level, can adsorb a large amount of urea, for example.

As described above, the adsorbent of this embodiment contains Li whose amount is sufficiently suppressed being compared with the Li content in the prior MXene. Hence, MXene that constitutes the adsorbent of this embodiment may occasionally be referred to as "Li-suppressed MXene", for distinction from the prior MXene.

The paragraphs below will explain a MXene particle, which corresponds to a skeleton of the Li-suppressed MXene that constitutes the adsorbent according to this embodiment, referring to FIGS. 1A and 1B. FIGS. 1A and 1B do not illustrate Li possibly contained therein.

The adsorbent of this embodiment is an aggregate that contains one layer of MXene 10*a* (monolayer MXene) schematically exemplified in FIG. 1A. In more detail, MXene 10*a* equals to a MXene layer 7*a* that comprises a layer body ($M_mX_n$ layer) 1*a* whose composition is represented by $M_mX_n$, and a modified/terminal part T 3*a*, 5*a* that resides on the surface of the layer body 1*a* (more specifically, at least one of two opposing surfaces of the layer). Therefore, the MXene layer 7*a* is also represented as "$M_mX_nT_s$", where s represents any number.

The adsorbent of this embodiment may comprise a multilayer MXene, besides the monolayer MXene. The multilayer MXene is exemplified by, but not limited to, MXene 10*b* having two layers as schematically illustrated in FIG. 1B. Reference signs 1*b*, 3*b*, 5*b*, and 7*b* in FIG. 1B are equivalent to 1*a*, 3*a*, 5*a*, and 7*a* in FIG. 1A in the above. Two adjacent MXene layers (7*a* and 7*b*, for example) of the multilayer MXene are not always necessarily kept apart entirely, instead allowing partial contact. The MXene 10*a* may occasionally be a monolayer product delaminated from the multilayer MXene 10*b*, and thus may occasionally be a mixture in which the monolayer MXene 10*a* and the multilayer MXene 10*b*, remained laminated, coexist. Even in a case where the multilayer MXene is contained, such multilayer MXene preferably has a smaller number of layers (less-layered) obtainable after delamination. The "less-layered" typically means that MXene has ten or less layers. The "less-layered multilayer MXene" may occasionally be referred to as "less-layered MXene". The less-layered MXene preferably has a thickness, in the direction of lamination, of 10 nm or less. The monolayer MXene and the less-layered MXene may collectively be referred to as "monolayer/less-layered MXene"

The adsorbent of this embodiment preferably has a large proportion of monolayer/less-layered MXene. With abundance of the monolayer/less-layered MXene, the MXene will have a surface area larger than that of the multilayer MXene, making it possible to adsorb a larger amount of target substance to be adsorbed, and to enhance the adsorption performance. For example, in the adsorbent of this embodiment, the monolayer/less-layered MXene, having 10 or less layers laminated therein and preferably having a thickness of 10 nm or less, preferably accounts for 80% by volume of more in the whole MXene, the percentage is more preferably 90 vol % or larger, and even more preferably 95 vol % or larger. The volume of the monolayer MXene is more preferably larger than the volume of the less-layered MXene. In other words, the mass of the monolayer MXene is preferably larger than the mass of the less-layered MXene, since the true density of these MXenes does not greatly vary depending on the form of existence. With such proportion, the adsorbent will have further increased surface area, and will therefore have further enhanced adsorption performance. Most preferably, the adsorbent of this embodiment is composed only of the monolayer MXene.

(Average Thickness of Particle)

The particle has an average thickness of 1 nm to 10 nm. The thickness is preferably 7 nm or less, and more preferably 5 nm or less. Meanwhile in consideration of the thickness of the monolayer MXene, the lower limit of the thickness of the particle will be 1 nm as described above. For the monolayer MXene, the thickness of the particle corresponds to the thickness of the MXene layer 7*a* in FIG. 1, meanwhile for the multilayer MXene (preferably less-layered MXene) such as double-layered MXene as illustrated in FIG. 1B, the thickness corresponds to the sum of the thickness of the MXene layer 7*a*, gap Δd, and the thickness of the MXene layer 7*b*.

The average thickness of particle is determined as follows. The sample is photographed using an atomic force microscope (AFM) as described later in EXAMPLES, the thickness is measured for each of fifty MXene particles randomly selected on the photograph, and the measured values are then averaged.

(Average Maximum Dimension of Particle Measured in Plane in Parallel with Particle Layer)

The average maximum dimension of the particle, measured in a plane in parallel with the particle layer, is preferably 0.1 μm to 20 μm. With the average maximum dimension preferably adjusted to 0.1 μm or larger, the adsorbent will have a larger surface area, and can further improve the adsorption performance for a target substance to be adsorbed such as urea. On the other hand, the average maximum dimension is preferably 20 μm or less, typically from the viewpoint of achieving a necessary level of dispersibility in solution such as dialysate used for artificial dialysis, which is more preferably 15 μm or less, and even more preferably 10 μm or less.

The average maximum dimension of the particle measured in a plane in parallel with the particle layer may be determined as follows. The sample is photographed using a scanning electron microscope (SEM) as described later in EXAMPLES, the maximum dimension, in the direction in parallel with a sheet plane, is measured for each of fifty MXene particles randomly selected on the photograph, and the measured values are then averaged.

(Interlayer Distance in Sheet-Formed Adsorbent)

The adsorbent of this embodiment contains only a few Li ion between the layers that constitute MXene, and has therefore a distance between the layers that constitute MXene shorter than that of Li ion-rich MXene. This may be understood from an XRD profile obtainable by X-ray diffractometry of the adsorbent of this embodiment made into a sheet form. For example, this may be understood from the XRD profile obtainable by X-ray diffractometry of the sheet-formed adsorbent, on the basis of a peak position in a low-angle region at or below 10° (deg) ascribable to the (002) plane of MXene. The larger the peak angle in the XRD profile, the narrower the interlayer distance. The adsorbent of this embodiment preferably demonstrates the (002) plane peak at an angle 2θ of 8.0° or larger, when the sheet-formed sample is measured by X-ray diffractometry. The peak position more preferably resides at 8.5° or larger. The upper limit of the peak position resides at approximately 9.0°. The peak position is defined by the peak top. The X-ray diffractometry may only be conducted under conditions described later in EXAMPLES.

The aforementioned "distance between layers that constitutes MXene" encompasses any of the embodiments below:

- the distance between MXene monolayers in a structure having two units of monolayer MXene overlapped therein;
- the distance between a monolayer MXene and a multilayer MXene (preferably a less-layered MXene) in a structure having a monolayer MXene and a multilayer MXene (preferably a less-layered MXene) overlapped therein;
- the distance between layers (or gap length, indicated by Δd in FIG. 1B) in one multilayer MXene (preferably a less-layered MXene); and
- the distance between the units of multilayer MXene in a structure having two units of multilayer MXene (preferably, two units of less-layered MXene) overlapped therein.

Figure 2:
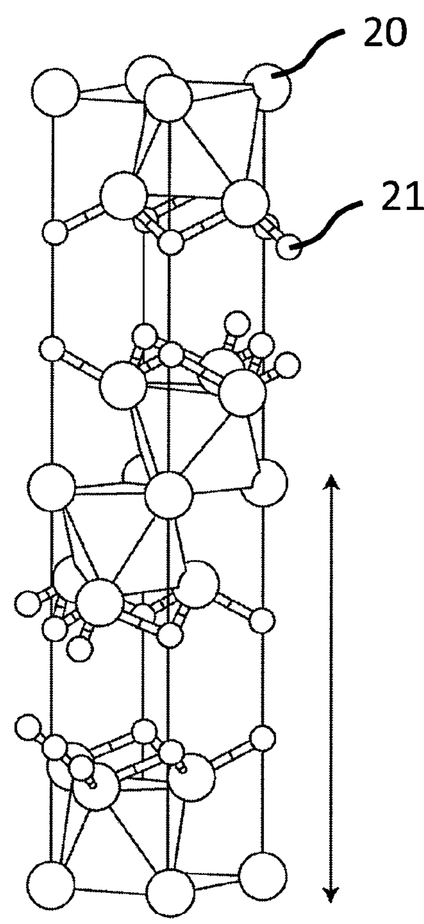
FIG. 2 is a diagram for explaining an interlayer distance in a certain form of the adsorbent according to the present disclosure.

Among these embodiments, the distance between layers in one multilayer MXene (preferably, a less-layered MXene) will be described referring to FIG. 2. FIG. 2 is a diagram explaining a crystal structure of $Ti_3C_2O_2$ (O-term), in which $M_mX_n$ is given by $Ti_3C_2$ as an example of MXene. In FIG. 2, reference numeral 20 represents a titanium atom, and 21 represents an oxygen atom, with any other element unillustrated. Referring now to FIG. 2, the interlayer distance between the layers in a multilayer MXene (preferably a less-layered MXene) is indicated by a double-headed arrow.

The interlayer distance (or the void size, indicated by $\Delta d$ in FIG. 1B) for the individual laminates of the multilayer MXene (preferably less-layered MXene) possibly contained may typically be 0.8 nm to 10 nm, and particularly 0.8 nm to 5 nm, without limiting this embodiment.

(Adsorbent Formed of Composite Material)

The adsorbent of this embodiment is also exemplified by those that further contain one or more materials selected from ceramic, metal, and resin material. As will be exemplified later, the adsorbent of this embodiment, intended for use for urea adsorption in artificial dialysis, may be embodied as an adsorbent capable of stably demonstrating the adsorption performance, such as urea adsorption performance, by compounding the Li-suppressed MXene of this embodiment with at least one material selected from ceramic, metal, or resin material, to obtain a composite material.

The ceramic is exemplified by metal oxides such as silica, alumina, zirconia, titania, magnesia, cerium oxide, zinc oxide, barium titanates, hexaferrite, and mullite; and non-oxide ceramics such as silicon nitride, titanium nitride, aluminum nitride, silicon carbide, titanium carbide, tungsten carbide, boron carbide, and titanium boride. The metal is exemplified by iron, titanium, magnesium, aluminum, and alloys that contain any of these metals as a base metal.

The resin material (polymer) is exemplified by cellulose-based ones and synthetic polymer-based ones. The polymer is exemplified by hydrophilic polymers (including hydrophobic polymer which was turned to be hydrophilic after blended with a hydrophobic auxiliary, and hydrophobic polymer or the like, whose surface was hydrophilized). The hydrophilic polymer is exemplified by those that contain one or more selected from the group consisting of polysulfone, cellulose acetate, regenerated cellulose, polyether sulfone, water-soluble polyurethane, polyvinyl alcohol, sodium alginate, acrylate-based water-soluble polymer, polyacrylamide, polyaniline sulfonic acid, and nylon.

The hydrophilic polymer suitably used here is exemplified by a hydrophilic polymer having a polar group, wherein the polar group can form a hydrogen bond with a modified/terminal part T of the Li-suppressed MXene layer. The polymer suitably used here is exemplified by one or more polymers selected from the group consisting of water-soluble polyurethane, polyvinyl alcohol, sodium alginate, acrylate-based water-soluble polymer, polyacrylamide, polyaniline sulfonic acid, and nylon. Among them, one or more polymers selected from the group consisting of water-soluble polyurethane, polyvinyl alcohol, and sodium alginate are more preferred; and water-soluble polyurethane is even more preferred.

The adsorbent formed of the composite material, and typically intended for biological use, is exemplified by high-molecular polymer that constitutes a component of hemodialyzer or hemofilter. Such high-molecular polymer is more specifically exemplified by polymethyl methacrylate, polyacrylonitrile, cellulose, cellulose acetate, polysulfone, polyvinyl alcohol, and vinyl alcohol copolymer such as polyvinyl alcohol-ethylene copolymer. Preferred is one or more of polysulfone, polymethyl methacrylate, or cellulose acetate. Polysulfone or polymethyl methacrylate is more preferred.

Proportion of the polymer contained in the composite material may be appropriately determined depending on applications. The proportion of the polymer, in terms of volume proportion in the adsorbent (dried), is more than 0%, which may typically be 80% or less, even may be 50% or less, yet may be 30% or less, further may be 10% or less, and again further may be 5% or less.

The adsorbent formed of the composite material may be manufactured by any method not particularly limited. For example, the adsorbent of this embodiment, containing the polymer and having a sheet form, may be manufactured typically by mixing Li-suppressed MXene and the polymer, and by forming a coating film, as described below.

First, an aqueous dispersion or an organic solvent dispersion of Li-suppressed MXene, obtainable by dispersing a particle formed of Li-suppressed MXene in a dispersion medium, or, a Li-suppressed MXene powder, may only be mixed with the polymer. The dispersion medium of the Li-suppressed MXene aqueous dispersion is typically water, which may optionally contain a relatively small amount (for example, 30% by mass or less, and preferably 20% by mass or less, on an overall basis) of other liquid substances.

The Li-suppressed MXene particle and the polymer may be mixed typically using a dispersing device such as homogenizer, propeller stirrer, thin film spinning mixer, planetary mixer, mechanical shaker, or vortex mixer.

A slurry obtained by mixing of the Li-suppressed MXene particle and the polymer may only be applied to a base (substrate, for example), by a coating method not particularly limited. The coating method is exemplified by spray coating through a nozzle such as one-fluid nozzle, two-fluid nozzle, or air brush; slit coating using table coater, comma coater or bar coater; printing such as screen printing or metal mask printing; and methods that rely upon spin coating, dipping or drip application.

The application and drying may be repeated twice or more times as necessary, until a film of a desired thickness will be obtained. Drying and curing may take place typically in a normal pressure oven or a vacuum oven, at a temperature of 400° C. or below.

The adsorbent of this embodiment, formed of a composite material that contains ceramic or metal, may be manufactured by a method, by which a particulate Li-suppressed MXene is mixed with a particulate ceramic or metal, and the mixture is heated at a low temperature at which the chemical composition of the Li-suppressed MXene can be maintained, to form the adsorbent.

(Form of Adsorbent)

The form of the adsorbent of this embodiment is not limited. Possible forms of the adsorbent include not only sheet form such as film, but also include those with proper thickness, rectangular parallelepiped, sphere, or polygonal article.

(Adsorption Sheet)

The adsorbent of this embodiment is preferably embodied in an adsorption sheet. Possible adsorption sheet includes not only the one formed of the adsorbent of this embodiment, that is the Li-suppressed MXene, or formed of a composite material that contains the same; but also the one formed on the surface of a substrate in which the adsorbent of this embodiment formed of one or more materials selected from ceramic, metal, and resin materials. The ceramic, metal, and resin materials usable here may be the materials previously enumerated in the description regarding the composite material. Among them, preferred is an adsorption sheet having the adsorbent of this embodiment formed on a substrate formed of the resin material, preferably the aforementioned polymer. The adsorbent of this embodiment may be embodied on the substrate, while being formed over the entire surface of the substrate typically by coating, or while being formed on at least a part of the substrate. The adsorbent may be formed on the substrate by any of known methods having been widely applied, such as dipping; methods using brush, roller, roll coater, air spray, airless spray, curtain flow coater, roller curtain coater, or die coater; and electrostatic coating. The thickness of the adsorption sheet and the thickness of the substrate may be appropriately determined, depending on applications.

(Applications of Adsorbent)

One of applications of the adsorbent of this embodiment relates to adsorption of polar organic compound. The polar organic compound is a general term for organic compounds that exhibit polarity, having a polar group such as OH group, $NO_2$ group, NH group, $NH_2$ group, or COOH group capable of forming a hydrogen bond with a hydrogen atom of water molecule, when the compound is mixed with water. Among these polar organic compounds, polar solvents such as alcohol having hydroxy group, amino group-containing compound, and ammonia are exemplified as the compound to be adsorbed. The adsorbent of this embodiment is typically used for adsorbing the aforementioned compounds having one or both of hydroxy group and amino group, and ammonia. Among the compounds having one or both of hydroxy group and amino group, the hydroxy group-containing compound is exemplified by monohydric alcohol having 1 to 22 carbon atoms; polyhydric phenol; polyhydric alcohols such as ethylene glycol, propylene glycol, and glycerin; alkanolamine such as triethanolamine; and sugars such as xylose and glucose. The amino group-containing compound is exemplified by monoamines such as methylamine and dimethylamine; diamine such as ethylenediamine; polyamine such as diethylenetriamine; aromatic amine such as aniline; amino acids such as valine and leucine; urea, uric acid, urate, and creatinine. The compound having both of hydroxy group and amino group is exemplified by ethanolamine and diethanolamine.

The adsorbent of this embodiment is preferably used for adsorbing uremic toxins that include urea, uric acid, and creatinine. The adsorbent of this embodiment may be most preferably used for adsorbing urea.

The adsorbent of this embodiment may be used for adsorbing and removing metabolic waste such as urea, typically in hemodialysis, hemofiltration, hemodiafiltration, or peritoneal dialysis. The adsorbent of this embodiment is also applicable to an artificial dialyzer used for hemodialysis, hemofiltration, hemodiafiltration, or peritoneal dialysis.

The artificial dialyzer is typically classified into hemodialyzer and peritoneal dialyzer, wherein the hemodialyzer is classified into those of one-pass type (single-pass type) and circulation type. The circulating type ones are further exemplified by those based on recirculating dialysate (REDY) system and other systems. The artificial dialyzer also classified into those based on a method of removing urea without contacting a patient's blood with a membrane, while creating a cross-flow of the blood and a dialysate; and a method that relies upon direct filtration of the blood. The peritoneal dialyzer is predominantly the one-pass type one. The adsorbent of this embodiment is applicable to either hemodialysis or peritoneal dialysis, and is typically applicable to adsorption membrane, separation membrane, or adsorbent cartridge for the artificial dialyzers including hemodialyzer and peritoneal dialyzer. The adsorbent of this embodiment is preferably used for an artificial dialysis membrane. An exemplary use of the adsorbent of this embodiment in the recirculating dialysate (REDY) system may also be an adsorbent cartridge.

Figure 3:
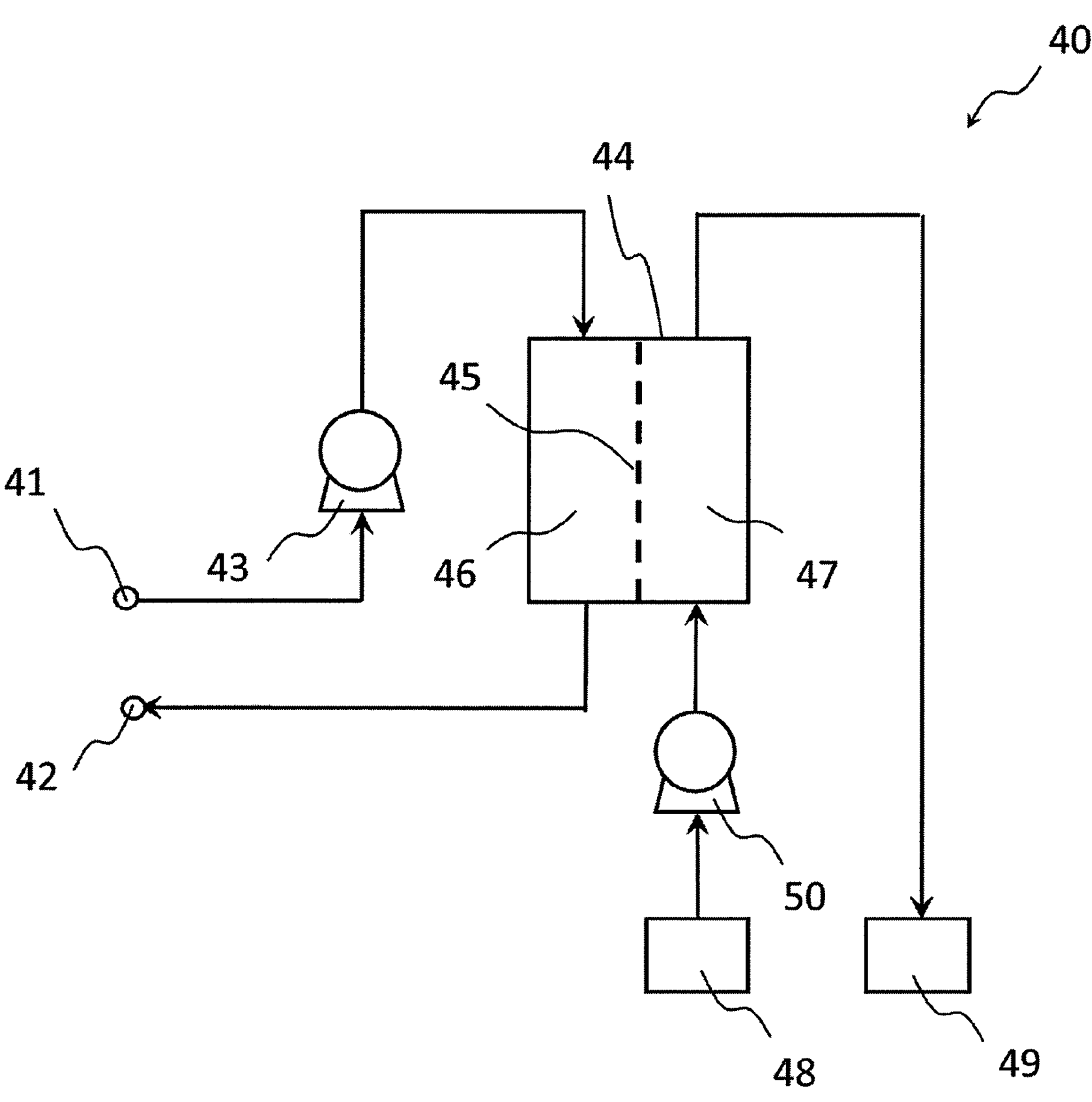
FIG. 3 is a diagram schematically illustrating an artificial dialyzer that uses the adsorbent according to the present disclosure.

FIG. 3 schematically illustrates a one-pass hemodialyzer, as an example of artificial dialyzer using the adsorbent according to the present invention. In a hemodialyzer 40 illustrated in FIG. 3, untreated blood introduced through a blood inlet 41 is delivered to a blood purifier 44 with the aid of a blood pump 43. On the other hand, a dialysate is delivered from a fresh dialysate tank 48 to the blood purifier 44 with the aid of a dialysate pump 50. The blood in a blood transit area 46 of the blood purifier 44 goes through hemodialysis, hemodiafiltration, or hemofiltration through a separation membrane 45, during which any substance wished to be removed passes through the separation membrane 45, and moves to a dialysate transit area 47 of the blood purifier 44. The purified blood is delivered to a blood outlet 42. On the other hand, the dialysate in the dialysate transit area 47, containing the substance wished to be removed, is delivered to a used dialysate tank 49. Although not illustrated in FIG. 3, the hemodialyzer may additionally be provided with any device having a path through which any optional chemical, protein or the like is supplemented to the blood being delivered before and/or after the treatment. The hemodialyzer may also be provided with a sensor for measuring flow rate of blood, flow rate of dialysate, and, if necessary, blood protein level. The hemodialyzer may also be provided with, in the middle of the flow path of the blood and/or the dialysate, an optional on-off valve that opens and closes the flow path.

The artificial dialysis membrane using the adsorbent of this embodiment is suitable typically for the hemodialysis. Material for composing the dialysis membrane, together with the adsorbent of this embodiment, is exemplified by cellulose-based and synthetic polymer-based materials having widely been used for hemodialysis or the like. Such high-molecular polymer is more specifically exemplified by polymethyl methacrylate, polyacrylonitrile, cellulose, cellulose acetate, polysulfone, polyvinyl alcohol, and vinyl alcohol copolymer such as polyvinyl alcohol-ethylene copolymer. The material used here is preferably one or more selected from the group consisting of polysulfone, polymethyl methacrylate, and cellulose acetate, and more preferably either one or both of polysulfone or polymethyl methacrylate. The form of the artificial dialysis membrane is exemplified those of porous type, hollow fiber type, and flat sheet lamination type, without special limitation.

Second Embodiment: Method for Manufacturing Adsorbent

A method for manufacturing the adsorbent in the embodiment of the present invention will be detailed below, without restricting the present disclosure to such embodiment.

A method for manufacturing an adsorbent according to this embodiment (first manufacturing method) comprises:

(a) preparing a precursor represented by:

$$M_mAX_n$$

where, M represents at least one Group-3, -4, -5, -6, or -7 metal,

X represents a carbon atom, a nitrogen atom, or a combination thereof,

A represents at least one Group-12, -13, -14, -15, or -16 element, n is 1 to 4, and m is larger than n, and equal to or less than 5;

(b1) etching the precursor using an etching solution so as to remove at least a part of atom A from the precursor to obtain an etched product;

(c1) washing the etched product with water to obtain a water-washed product;

(d1) conducting Li intercalation including a process of mixing the water-washed product with a Li-containing compound to obtain a Li-intercalated product;

(e) conducting delamination including a process of stirring the Li-intercalated product to obtain a delaminated product;

(f) conducting acid treatment including a process of mixing the delaminated product with an acid solution to obtain an acid-treated product; and (g) washing the acid-treated product with water to obtain the adsorbent. Such manufacturing method can manufacture the adsorbent having a Li content in the adsorbent of 0.0001% by mass to 0.0020% by mass.

Another method for manufacturing an adsorbent according to another embodiment (second manufacturing method) comprises:

(a) preparing a precursor represented by:

$$M_mAX_n$$

where, M represents at least one Group-3, -4, -5, -6, or -7 metal,

X represents a carbon atom, a nitrogen atom, or a combination thereof,

A represents at least one Group-12, -13, -14, -15, or -16 element, n is 1 to 4, and m is larger than n, and equal to or less than 5;

(b2) etching the precursor using an etching solution that contains a Li-containing compound so as to remove at least a part of atoms A from the precursor concurrently with Li intercalation to obtain an etched-and-Li-intercalated product;

(c2) washing the etched-and-Li-intercalated product with water to obtain a water-washed product;

(e) conducting delamination including a process of stirring the water-washed product to obtain a delaminated product;

(f) conducting acid treatment including a process of mixing the delaminated product with an acid solution to obtain an acid-treated product; and (g) washing the acid-treated product with water to obtain the adsorbent. Such manufacturing method can manufacture the adsorbent having a Li content in the adsorbent of 0.0001% by mass to 0.0020% by mass.

While at least a certain amount of Li is necessarily intercalated to obtain the monolayer/less-layered MXene, the manufacturing method of this embodiment can manufacture the monolayer/less-layered MXene with an extremely small Li content, since the Li used for the Li intercalation is removed after converting MXene into monolayer or less-layered one by Li intercalation. Next, the individual steps in the first manufacturing method and the second manufacturing method will be detailed. The step (a) and the steps (e) to (g), which are common to the two production methods, will be described collectively.

Step (a)

First, a predetermined precursor is prepared. The predetermined precursor usable in this embodiment is a MAX phase that is a precursor of MXene, represented by:

$$M_mAX_n$$

where, M represents is at least one Group-3, -4, -5, -6, or -7 metal,

X represents a carbon atom, a nitrogen atom, or a combination thereof,

A represents at least one Group-12, -13, -14, -15, or -16 element, n is 1 to 4, m is larger than n, and equal to or less than 5.

M, X, n, and m are same as those having been described for MXene. A represents at least one Group-12, -13, -14, -15, or -16 element, which is usually a Group-A element, typically a Group-IIIA or Group-IVA element, and may more particularly contain at least one selected from the group consisting of Al, Ga, In, Tl, Si, Ge, Sn, Pb, P, As, S, and Cd, and is preferably Al.

The MAX phase has a crystal structure in which a layer constituted by atom A is located between two layers represented by $M_mX_n$ (possibly having a crystal lattice with each X positioned in an octahedral array of M). The MAX phase, representatively with m=n+1, has a repeating unit in which a layer of atoms X is interposed one by one, between every adjacent one of (n+1) layers of atoms M (these layers are also collectively referred to as "$M_mX_n$ layer"), and a layer of atoms A ("atom A layer") is disposed next to the (n+1)th layer of atoms M. The MAX phase is, however, not limited thereto.

The MAX phase may be produced by any of known methods. For example, TiC powder, Ti powder, and Al powder are mixed in a ball mill, and the obtained mixed powder is fired under an Ar atmosphere, to obtain a fired product (block-type MAX phase). The fired product is then milled with an endmill, to obtain a powdery MAX phase to be subjected to any subsequent step.

Step (b1)

In the first manufacturing method, etching is conducted to remove at least a part of atoms A from the precursor using an etching solution. The etching may employ any of known conditions without special limitation. The etching may be conducted using $F^-$-containing etching solution, wherein the method is exemplified by those using hydrofluoric acid, mixed solution of hydrofluoric acid and hydrochloric acid, and mixed solution of lithium fluoride and hydrochloric acid. The etching solution may further contain phosphoric acid, for example. These methods may employ mixed solution of any of the aforementioned acids, with pure water as a solvent. An etched product obtainable by the etching may be exemplified by slurry.

Step (c1)

The etched product obtained by the etching is washed with water. The water washing can thoroughly remove the acid and so forth used in the etching. The amount of water to be mixed with the etched product, and the washing method are not particularly limited. For example, water may be added to the etched product, and the mixture may be stirred and centrifuged. Stirring method is exemplified by those that rely upon hand shaking, automatic shaker, shear mixer or pot mill. Degree of stirring, such as stirring speed and stirring time, may be controlled typically depending on the amount or concentration of the etched product to be washed. The water washing may be conducted once or more times. The water washing is preferably conducted twice or more times. A specific example of the water washing may be conducted by repeating steps (i) to (iii) below twice or more, typically within fifteen times: (i) adding water (to the etched product, or to the residual precipitate obtained in (iii)

below), and stirring the mixture; (ii) centrifuging the stirred product; and (iii) discarding the supernatant after centrifugation.

Step (d1)

Li intercalation treatment including a process of mixing the water-washed product obtained by the water washing, with a Li-containing compound is conducted.

The Li-containing compound is exemplified by Li ion-containing metal compound. The Li ion-containing metal compound usable here may be ionic compound in which Li ion and anion are bound. The ionic compound of Li ion is exemplified by halides such as iodide, chloride, and fluoride; phosphate; sulfide including sulfate; nitrate; acetate; and carboxylate.

The content of the Li-containing compound, in the formulation for intercalation, is preferably 0.001% by mass or more. The content is more preferably 0.01% by mass or more, and even more preferably 0.1% by mass or more. On the other hand, the content of the Li-containing compound is preferably 10% by mass or less from the viewpoint of dispersibility in the solution, which is more preferably 1% by mass or less.

Method for the intercalation is not particularly limited, and may typically rely upon mixing of the Li-containing compound to the water-based clay of MXene, followed by stirring or standing still. The mixture is typically stirred at room temperature. Methods for the stirring are exemplified by those using a stirring element such as stirrer, or a stirring blade, or a mixer, or a centrifuge. Stirring time may be determined depending on the manufacturing scale of the adsorbent, typically within the range from 12 to 24 hours.

In the second manufacturing method, the etching of the precursor and the Li intercalation are conducted in step (b2) in one operation.

Step (b2)

In the second manufacturing method, at least a part of atoms A (and occasionally a part of atoms M) is etched (for removal, or occasionally for delamination) from the precursor, using an etching solution that contains the Li-containing compound, wherein $L_1$ is concurrently intercalated.

In this embodiment, the Li intercalation in which Li ion is intercalated between the $M_mX_n$ layers takes place, when at least a part of atoms A (and occasionally a part of atoms M) is etched (for removal, or occasionally for delamination) from the MAX phase.

The Li-containing compound usable here may be the ionic compound described in step (d1) in the first manufacturing method. Content of the Li-containing compound in the etching solution is preferably 0.001% by mass or more. The content is more preferably 0.01% by mass or more, and even more preferably 0.1% by mass or more. On the other hand, the content of the Li-containing compound in the etching solution is preferably 10% by mass or less from the viewpoint of dispersibility in the solution, which is more preferably 1% by mass or less.

The etching solution in step (b2) may only contain the Li-containing compound, to which any known conditions are applicable, without limiting any other constitution of the etching solution. The etching may be conducted using $F^-$-containing etching solution, as previously described in step (b1), wherein the method is exemplified by those using hydrofluoric acid, mixed solution of hydrofluoric acid and hydrochloric acid, and mixed solution of lithium fluoride and hydrochloric acid. The etching solution may further contain phosphoric acid, for example. These methods may employ mixed solution of any of the aforementioned acids, with pure water as a solvent. An etched product obtainable by the etching may be exemplified by slurry.

Step (c2)

The product obtained by the etching and the Li intercalation (etched-and-Li-intercalated) product is washed with water. The water washing can thoroughly remove the acid and so forth used in the etching-and-Li-intercalation. The amount of water to be mixed with the (etched-and-Li-intercalated) product, and the washing method are not particularly limited. For example, water may be added to the etched product, and the mixture may be stirred and centrifuged. Stirring method is exemplified by those that rely upon hand shaking, automatic shaker, shear mixer or pot mill. Degree of stirring, such as stirring speed and stirring time, may be controlled typically depending on the amount or concentration of the product to be washed. The water washing may be conducted once or more times. The water washing is preferably conducted twice or more times. A specific example of the water washing may be conducted by repeating steps (i) to (iii) below twice or more, typically within fifteen times: (i) adding water (to the etched-and-Li-intercalated product, or to the residual precipitate obtained in (iii) below), and stirring the mixture; (ii) centrifuging the stirred product; and (iii) discarding the supernatant after centrifugation.

Comparing between the first manufacturing method and the second manufacturing method, the first manufacturing method, in which step (b1) of etching and step (d1) of Li intercalation are independent, is preferred since MXene may be more easily converted to monolayer one.

Step (e)

Delamination is conducted, in which the process includes stirring the Li-intercalated product obtained by the Li intercalation in step (d1) in the first manufacturing method, or the water-washed product obtained by the water washing in step (c2) in the second manufacturing method. The delamination can convert MXene to monolayer or less-layered one. The delamination may be conducted under conditions not particularly limited, according to any of known methods. Stirring method is exemplified by those that rely upon hand shaking, or automatic shaker. Degree of stirring, such as stirring speed and stirring time, may be controlled typically depending on the amount or concentration of the product to be washed. An exemplary method is such that the slurry after the intercalation is centrifuged, the supernatant is discarded, pure water is added to the residual precipitate, and the mixture is then stirred by hand shaking or using an automatic shaker, to cause delamination. An exemplary process of removing the non-delaminated product may be such as discarding the supernatant after centrifugation, and washing the residual precipitate with water. For example, (i) pure water is added to the residual precipitate after discarding the supernatant, and stirred, (ii) the mixture is centrifuged, and (iii) the supernatant is recovered. The operations of (i) to (iii), repeated once or more, preferably twice or more, and ten times or less, can yield the supernatant that contains monolayer/less-layered MXene before acid treatment, as the delaminated product. An alternative method may be such as centrifuging the supernatant, discarding the supernatant resulted from the centrifugation, thereby obtaining, as the delaminated product, a clay that contains the monolayer/less-layered MXene before acid treatment.

The manufacturing method of this embodiment does not rely upon sonication for the delamination. Without relying upon sonication as described above, the method is less likely to destroy the particle, and thus can produce the adsorbent that contains monolayer/less-layered MXene having a large plane in parallel with the layers of the particle, that is, a two-dimensional plane.

Step (f)

Acid treatment (also referred to as "acid washing") is conducted, in which the process includes mixing the delaminated product (supernatant or clay that contains the monolayer/less-layered MXene) obtained by the delamination, with an acid solution. This acid treatment can reduce the Li content in the adsorbent. Considering now, for example, adsorption of urea with MXene in artificial dialysis, such adsorption of urea is synonymous with intercalation of urea, wherein MXene has a fixed capacity per unit volume for intercalation. The acid treatment can remove excessive intercalator (Li in this case) that remains after the Li intercalation, and can therefore increase the amount of urea adsorption in artificial dialysis.

Acid used for the acid treatment may typically be inorganic acid such as mineral acid, and/or organic acid, without limitation. The acid is preferably the inorganic acid only, or mixed acid of inorganic acid and organic acid. The acid is more preferably inorganic acid only. The inorganic acid usable here may typically be one or more of hydrochloric acid, sulfuric acid, nitric acid, phosphoric acid, perchloric acid, hydroiodic acid, hydrobromic acid, or hydrofluoric acid. The inorganic acid is preferably either or both of hydrochloric acid and sulfuric acid. The organic acid is exemplified by acetic acid, citric acid, oxalic acid, benzoic acid, and sorbic acid. Concentration of the acid solution to be mixed with the delaminated product may only be adjusted, depending on the amount or concentration of the delaminated product to be treated.

The delaminated product and the acid solution are mixed. The delaminated product and the acid solution may also be mixed and stirred. Stirring method is exemplified by those that rely upon hand shaking, automatic shaker, shear mixer or pot mill. Degree of stirring, such as stirring speed and stirring time, may be controlled typically depending on the amount or concentration of the product to be delaminated.

Mixing and stirring of the acid solution may take place under heating or without heating. After adding the acid solution, the mixture may be stirred without heating, or may be stirred under heating so as to keep the liquid temperature at 80° C. or below.

The aforementioned mixing, or the mixing and stirring, may be typically followed by centrifugation, and removal of the supernatant, thereby obtaining the acid-treated product in the form of slurry. The mixing with the acid solution and the subsequent stirring may be conducted once or more. From the viewpoint of further reducing the Li content in the MXene particles, mixing with a fresh acid solution (acid solution not yet used for the acid treatment) and stirring of the mixture are preferably repeated twice or more, and typically ten times or less. An exemplary mode of the aforementioned operation repeated multiple times may be conducted by repeating steps (i) to (iii) below twice or more, typically within ten times: (i) mixing a fresh acid solution (to the delaminated product, or to the residual precipitate obtained in (iii) below), and stirring the mixture; (ii) centrifuging the stirred product; and (iii) discarding the supernatant after centrifugation.

The acid-treated product obtained by the acid treatment preferably has a pH of 2.5 or less. The pH is more preferably 2.0 or less, even more preferably 1.5 or less, and yet more preferably 1.2 or less. The lower limit of the pH is approximately 1.0, but not limited thereto. With the pH of the acid-treated product thus fully suppressed, the MXene particle would become less dispersible, and would be difficult to handle in the subsequent process. This embodiment can, however, solve the problem by water washing in the next process, unlike as described in Non-Patent Document 1.

Unlike as described in Non-Patent Document 1, the present disclosure intentionally removes Li by the acid treatment as described above, and can therefore further reduce the Li content in the MXene particle.

Step (g)

The acid-treated product obtained by the acid treatment is washed with water to obtain an adsorbent. The water washing can elevate the pH having been lowered in the aforementioned acid treatment. The acid-treated product, after washed with water, preferably has a pH of 4 or above, which is preferably 7 or below, for example. According to this embodiment, the acid treatment in step (f), followed by the water washing so as to adjust the pH to 4 or above, will reconstruct the OH group which is likely to adsorb urea or the like on the surface of MXene, supposedly enhancing the adsorption activity, and increasing the amount of urea adsorption. The amount of water to be mixed with the acid-treated product, and the washing method are not particularly limited. For example, water may be added to the etched product, and the mixture may be stirred and centrifuged. Stirring method is exemplified by those that rely upon hand shaking, automatic shaker, shear mixer or pot mill. Degree of stirring, such as stirring speed and stirring time, may be controlled typically depending on the amount or concentration of the acid-treated product to be washed. The water washing may be conducted once or more times. The water washing is preferably conducted twice or more times. A specific example of the water washing may be conducted by repeating steps (i) to (iii) below twice or more, typically within ten times: (i) adding water (to the acid-treated product, or to the residual precipitate obtained in (iii) below), and stirring the mixture; (ii) centrifuging the stirred product; and (iii) discarding the supernatant after centrifugation.

Having detailed the adsorbent, the method for manufacturing the same, the adsorption sheet, the artificial dialysis membrane, and the artificial dialyzer according to this embodiment of the present invention, all of them may be modified in various ways. Note that the adsorbent of the present disclosure may be manufactured by a method different from the manufacturing method in the aforementioned embodiment, and that the method for manufacturing the adsorbent of the present disclosure is not limited to those for providing the adsorbent in the aforementioned embodiment.

EXAMPLES

Preparation of MXene-Containing Samples

Examples 1 to 4

In Examples 1 to 4, clays that contain monolayer/less-layered MXene were obtained as MXene-containing samples, by sequentially going through (1) preparation of a precursor (MAX), (2) etching of the precursor, (3) post-etching water washing, (4) Li intercalation, (5) delamination, (6) acid treatment, and (7) water washing, which will be detailed below.

(1) Preparation of Precursor (MAX)

TiC powder, Ti powder, and Al powder (all from Kojundo Chemical Laboratory Co., Ltd.), in a mole ratio of 2:1:1, were placed in a ball mill that contains zirconia balls, and were mixed for 24 hours. The obtained mixed powder was fired at 1350° C. for two hours in an Ar atmosphere. The thus obtained fired product (block-type MAX) was milled with an endmill to a maximum dimension of 40 μm or below. A $Ti_3AlC_2$ particle was thus obtained as a precursor (powdery MAX).

(2) Etching of Precursor

Thus prepared $Ti_3AlC_2$ particle (powder) was then etched under the following etching conditions, to obtain a solid-liquid mixture (slurry) that contains a solid component derived from the $Ti_3AlC_2$ powder.

(Etching Conditions)

Precursor: $Ti_3AlC_2$ (undersize fraction through 45 μm sieve)

Composition of etching solution: 49% HF 6 mL
$H_2O$ 18 mL
HCl (12M) 36 mL

Charge amount of precursor: 3.0 g

Etching vessel: 100 mL iboy

Etching temperature: 35° C.

Etching time: 24 h

Stirrer rotation speed: 400 rpm (3) Post-Etching Water Washing

The slurry was halved, each half was placed in each of two 50 mL centrifuge tubes, centrifuged using a centrifuge at 3500 G, and the supernatant was then discarded. Next, (i) 40 mL of pure water was added to the residual precipitate in each centrifuge tube, (ii) the mixture was centrifuged again at 3500 G, and (iii) the supernatant was separated and discarded. The operations (i) to (iii) were repeated eleven times. After the final centrifugation, the supernatant was discarded, to obtain a $Ti_3C_2T_s$-water-based clay.

(4) Li Intercalation

Thus prepared $Ti_3C_2T_s$-water based clay was then subjected to Li intercalation using Li as an intercalator, under stirring at 20° C. or higher and 25° C. or lower for 10 hours. Detailed conditions for the Li intercalation are as follows.

(Conditions for Li Intercalation)

$Ti_3C_2T_s$-water based clay (water-washed MXene): solid content 0.75 g

LiCl: 0.75 g

Intercalation vessel: 100 mL iboy

Temperature: 20° C. or higher, 25° C. or lower (room temperature)

Time: 10 h

Stirrer rotation speed: 800 rpm (5) Delamination

The slurry obtained after the Li intercalation was placed in a 50 mL centrifuge tube, centrifuged using a centrifuge at 3500 G, and the supernatant was then discarded. Next, (i) 40 mL of pure water was added to the residual precipitate in the centrifuge tube, and the mixture was stirred with a shaker for 15 minutes, (ii) the mixture was centrifuged at 3500 G, and (iii) the supernatant was recovered as a monolayer/less-layered MXene-containing liquid. The operations (i) to (iii) were repeated four times in total to obtain a supernatant that contains monolayer/less-layered MXene. The supernatant was further centrifuged with a centrifuge at 4300 G for 2 hours, and the supernatant was then discarded, to obtain a clay that contains monolayer/less-layered MXene.

(6) Acid Treatment

To the clay that contains monolayer/less-layered MXene, (i) 35 mL of a 1.8 M hydrochloric acid was added, and the mixture was stirred with a shaker for 5 minutes, (ii) the mixture was centrifuged at 3500 G, and (iii) the supernatant was discarded. The operations (i) to (iii) were repeated five times in total.

(7) Water Washing

To the acid-treated clay that contains monolayer/less-layered MXene, (i) 35 mL of water was added, and the mixture was stirred with a shaker for 5 minutes, (ii) the mixture was centrifuged at 3500 G, and (iii) the supernatant was discarded. The operations (i) to (iii) were repeated five times in total to obtain a clay that contains monolayer/less-layered MXene, as the MXene-containing sample. The supernatant was checked to have a final pH of 4 or above.

Comparative Example 1

In Comparative Example 1, (1) Preparation of Precursor (MAX) was conducted in the same way as in Examples 1 to 4, and steps (2) and (3) below were sequentially conducted with reference to the method described in Non-Patent Document 1, to obtain a MXene-containing sample.

(1) Preparation of Precursor (MAX): same as in Examples 1 to 4.

(2) Etching of Precursor

The $Ti_3AlC_2$ particle (powder) prepared in step (1) was then etched under the following etching conditions, to obtain a solid-liquid mixture (slurry) that contains a solid component derived from the $Ti_3AlC_2$ powder.

Precursor: $Ti_3AlC_2$ (undersize fraction through 37 μm sieve)

Composition of etching solution: 50% HF 5 mL,
$H_2O$ 45 mL

Charge amount of precursor: 5.0 g

Etching vessel: 100 mL iboy

Etching temperature: 35° C.

Etching time: 24 h

Stirrer rotation speed: 400 rpm (3) Post-Etching Water Washing

The slurry was halved, each half was placed in each of two 50 mL centrifuge tubes, centrifuged using a centrifuge at 3500 G, and the supernatant was then discarded. (i) 40 mL of pure water was added to the residual precipitate in each centrifuge tube, (ii) the mixture was centrifuged again at 3500 G, and (iii) the supernatant was separated and removed. The operations (i) to (iii) were repeated ten times in total. After the final centrifugation, the tenth supernatant was checked to have the pH exceeding 5, and then the supernatant was discarded. The residual precipitate that constitutes $Ti_3C_2T_s$-multilayer MXene clay was obtained, as the MXene-containing sample.

Comparative Example 2

In Comparative Example 2, (1) Preparation of Precursor (MAX) was conducted in the same way as in Examples 1 to 4, and steps (2) to (5) below were sequentially conducted with reference to the method described in Non-Patent Document 2, to obtain a MXene-containing sample.

(1) Preparation of Precursor (MAX): same as in Examples 1 to 4.

(2) Etching of Precursor, and Li Intercalation

The $Ti_3AlC_2$ particle (powder) prepared in step (1) was then subjected to etching under the following etching conditions, and concurrently to the Li intercalation, to obtain a solid-liquid mixture (slurry) that contains a solid component derived from the $Ti_3AlC_2$ powder.

Precursor: $Ti_3AlC_2$ (undersize fraction through 45 μm sieve)

Composition of etching solution: LiF 2.4 g
HCl (9M) 30 mL

Charge amount of precursor: 1.5 g

Etching vessel: 100 mL iboy

Etching temperature: 25° C.

Etching time: 36 h

Stirrer rotation speed: 400 rpm (3) Post-Etching Water Washing 50 mL of the slurry was placed in a 50 mL centrifuge tube, centrifuged with a centrifuge at 3500 G, and the supernatant was then discarded. (i) 40 mL of pure water was added to the residual precipitate in the centrifuge tube, (ii) the mixture was centrifuged again at 3500 G, and (iii) the supernatant was separated and removed. The operations (i) to (iii) were repeated ten times, the tenth supernatant was checked to have the pH exceeding 5, the supernatant was then discarded, to obtain a $Ti_3C_2T_s$-water based clay.

(4) Delamination

To the $Ti_3C_2T_s$-water based clay, 200 mL of pure water was added, and the mixture was sonicated in an ultrasonic bath (ultrasonic cleaner (ASU series), Model 1-2160-03) at or below 10° C. for 15 minutes. The mixture was then centrifuged with a centrifuge at 2000 G for 20 minutes, the supernatant was recovered, and a slurry of the monolayer/less-layered MXene was recovered.

(5) pH Adjustment

To 59.0 mL of the slurry of the monolayer/less-layered MXene, 1 mL of a 6.0 M hydrochloric acid was added dropwise. The mixture was then sonicated in an ultrasonic bath, similarly to as in the aforementioned (4) delamination, at 10° C. or lower for 10 minutes, to obtain a slurry that contains the monolayer/less-layered MXene, as the MXene-containing sample.

Comparative Example 3

In Comparative Example 3, (1) Preparation of Precursor (MAX) was conducted in the same way as in Examples 1 to 4, and steps (2) to (5) below were sequentially conducted with reference to the method described in Non-Patent Document 3, to obtain a MXene-containing sample.

(1) Preparation of Precursor (MAX): same as Examples 1 to 4

(2) Etching of Precursor

The $Ti_3AlC_2$ particle (powder) prepared in step (1) was then etched under the following etching conditions, to obtain a solid-liquid mixture (slurry) that contains a solid component derived from the $Ti_3AlC_2$ powder.

(Etching Conditions)

Precursor: $Ti_3AlC_2$ (undersize fraction through 45 μm sieve)

Composition of etching solution: 49% HF 6 mL $H_2O$ 54 mL

Charge amount of precursor: 3.0 g

Etching vessel: 100 mL iboy

Etching temperature: 20° C. or higher, 25° C. or lower (room temperature)

Etching time: 24 h

Stirrer rotation speed: 400 rpm (3) Post-Etching Water Washing

The slurry was halved, each half was placed in each of two 50 mL centrifuge tubes, centrifuged using a centrifuge at 3500 G, and the supernatant was then discarded. (i) 40 mL of pure water was added to the residual precipitate in each centrifuge tube, (ii) the mixture was centrifuged again at 3500 G, and (iii) the supernatant was separated and removed. The operations (i) to (iii) were repeated eleven times in total. After the final centrifugation, the supernatant was discarded, to obtain a $Ti_3C_2T_s$-water based clay as the residual precipitate.

(4) TMAOH Intercalation

Thus prepared $Ti_3C_2T_s$-water based clay was then subjected to TMAOH intercalation using TMAOH as an intercalator, under stirring at 20° C. or higher and 25° C. or lower for 12 hours.

(Conditions for TMAOH Intercalation)

$Ti_3C_2T_s$-water based clay (water-washed MXene): Solid content 1.0 g

TMAOH·$5H_2O$: 1.98 g

Pure water: 100 mL

Intercalation vessel: 250 mL iboy

Temperature: 20° C. or higher, 25° C. or lower (room temperature)

Time: 12 h

Stirrer rotation speed: 800 rpm (5) Delamination

The slurry obtained after the TMAOH intercalation was halved, each half was placed in each of two 50 mL centrifuge tubes, centrifuged using a centrifuge at 3500 G, and the supernatant was then recovered. (i) 40 mL of pure water was added to the residual precipitate in each centrifuge tube, (ii) the mixture was centrifuged again at 3500 G, and (iii) the supernatant was recovered. The operations (i) to (iii) were repeated twice in total to obtain a clay that contains monolayer/less-layered MXene, as the MXene-containing sample.

Comparative Example 4

In Comparative Example 4, (1) Preparation of Precursor (MAX) was conducted in the same way as in Examples 1 to 4, and steps (2) and (3) below were sequentially conducted, to obtain a MXene-containing sample.

(1) Preparation of Precursor (MAX): same as in Examples 1 to 4.

(2) Etching of Precursor

The $Ti_3AlC_2$ particle (powder) prepared in step (1) was then etched under the following etching conditions, to obtain a solid-liquid mixture (slurry) that contains a solid component derived from the $Ti_3AlC_2$ powder.

Precursor: $Ti_3AlC_2$ (undersize fraction through 45 μm sieve)

Composition of etching solution: 49% HF 6 mL

HCl (9M) 45 mL $H_2O$ 9 mL

Charge amount of precursor: 3.0 g

Etching vessel: 100 mL iboy

Etching temperature: 35° C.

Etching time: 24 h

Stirrer rotation speed: 400 rpm (3) Post-Etching Water Washing

The slurry was halved, each half was placed in each of two 50 mL centrifuge tubes, centrifuged using a centrifuge at 3500 G, and the supernatant was then discarded. (i) 40 mL of pure water was added to the residual precipitate in each centrifuge tube, (ii) the mixture was centrifuged again at 3500 G, and (iii) the supernatant was separated and removed. The operations (i) to (iii) were repeated ten times in total. After the final centrifugation, the tenth supernatant was checked to have the pH exceeding 5, and then the supernatant was discarded. The residual precipitate that contains $Ti_3C_2T_s$-multilayer MXene clay was obtained as the MXene-containing sample.

Comparative Example 5

In Comparative Example 5, (1) Preparation of Precursor (MAX) was conducted in the same way as in Examples 1 to 4, and steps (2) to (5) below were sequentially conducted, to obtain a MXene-containing sample.

(1) Preparation of Precursor (MAX): same as in Examples 1 to 4.

(2) Etching of Precursor

The $Ti_3AlC_2$ particle (powder) prepared in step (1) was then etched under the following etching conditions, to obtain a solid-liquid mixture (slurry) that contains a solid component derived from the $Ti_3AlC_2$ powder.

Precursor: $Ti_3AlC_2$ (undersize fraction through 45 μm sieve)

Composition of etching solution: 49% HF 6 mL

HCl (9M) 45 mL $H_2O$ 9 mL

Charge amount of precursor: 3.0 g

Etching vessel: 100 mL iboy

Etching temperature: 35° C.

Etching time: 24 h

Stirrer rotation speed: 400 rpm (3) Post-Etching Water Washing

The slurry was halved, each half was placed in each of two 50 mL centrifuge tubes, centrifuged using a centrifuge at 3500 G, and the supernatant was then discarded. (i) 40 mL of pure water was added to the residual precipitate in each centrifuge tube, (ii) the mixture was centrifuged again at 3500 G, and (iii) the supernatant was separated and removed. The operations (i) to (iii) were repeated ten times in total. After the final centrifugation, the tenth supernatant was checked to have the pH exceeding 5, and then the supernatant was discarded, to obtain a $Ti_3C_2T_s$-water based clay as the residual precipitate.

(4) Li Intercalation

Thus prepared $Ti_3C_2T_s$-water based clay was then subjected to Li intercalation using Li as an intercalator, under stirring at 20° C. or higher and 25° C. or lower for 10 hours. Detailed conditions for the Li intercalation are as follows.

(Conditions for Li Intercalation)

$Ti_3C_2T_s$-water based clay (water-washed MXene): solid content 0.75 g

LiCl: 0.75 g

Intercalation vessel: 100 mL iboy

Temperature: 20° C. or higher, 25° C. or lower (room temperature)

Time: 10 h

Stirrer rotation speed: 800 rpm (5) Delamination

The slurry obtained after the Li intercalation was placed in a 50 mL centrifuge tube, centrifuged using a centrifuge at 3500 G, and the supernatant was then discarded. Next, (i) 40 mL of pure water was added to the residual precipitate in the centrifuge tube, and the mixture was stirred with a shaker for 15 minutes, (ii) the mixture was centrifuged at 3500 G, and (iii) the supernatant was recovered as the MXene-containing liquid. The operations (i) to (iii) were repeated four times in total to obtain a supernatant that contains MXene. The supernatant was further centrifuged with a centrifuge at 4300 G for 2 hours, and the supernatant was then discarded, to obtain a clay that contains monolayer/less-layered MXene, as the MXene-containing sample.

[Evaluation of MXene-Containing Samples]

[Measurement of Li Content in MXene]

MXene was liquefied by alkaline melting, and the Li content (residual intercalator content) in the MXene-containing sample was measured by ICP-AES based on inductively coupled plasma emission spectrometry (using iCAP 7400, from Thermo Fisher Scientific). Note that the Li content indicated by "-" in Table 1, for the samples of Comparative Examples prepared without using the Li-containing compound, is considered to be lower than 0.0001% by mass.

[Measurement of Average Thickness of Particle]

The sample was photographed in one or more shots with a field size of 50 μm×50 μm, using an atomic force microscope (AFM), the thickness was measured for each of fifty MXene particles randomly selected on each photograph, and then averaged to determine an average thickness from fifty particles.

The average thickness in Examples 1 to 4 were found to be 2.8 nm, 3.2 nm, 5.2 nm, and 2.5 nm, respectively.

[Measurement of Average in-Plane Maximum Length of Particle]

The sample was photographed in one or more shots using a scanning electron microscope (SEM) at a 5000× magnification, the maximum dimension in the direction in parallel with a sheet plane was measured for each of fifty MXene particles randomly selected on each photograph, and then averaged to determine an average maximum dimension from fifty particles.

The average maximum length in Examples 1 to 4 were found to be 10.4 μm, 7.1 μm, 13.5 μm, and 6.3 μm, respectively.

[Evaluation of Adsorption Performance]

The MXene-containing samples of Examples 1 to 4 and Comparative Examples 1 to 5 were subjected to measurement of the amount of adsorption of a substance to be adsorbed (urea) as follows, to evaluate urea adsorption performance of the MXene-containing samples.

(1) Preparation of Urea Solution

Weighed was 0.5 g of urea, which was added to 100 mL of pure water, and the mixture was diluted 100 fold to prepare a urea solution with a concentration of 5 mg/dL.

(2) Preparation of Assay Kit Solution

Using a bioassay kit (DIUR-100, from Funakoshi Co., Ltd.), liquid A and liquid B in the kit were mixed in equal volume, to prepare an assay kit solution.

(3) Preparation of Solution Containing Substance to be Adsorbed (Urea Solution)

Into a 500 ml beaker, 250 mL of the urea solution prepared in step (1) above was placed, the content was stirred on a hot stirrer at a rotation speed of 400 rpm and a liquid temperature of 37° C., to prepare a solution containing urea as a substance to be adsorbed. Nine preparations in total of the urea solution were made for the individual Examples and Comparative Examples.

(4) Urea Adsorption, and Sample Collection

As the MXene-containing samples of Examples 1 to 4 and Comparative Examples 1 to 5, each of 0.1 g of solid (powder) MXene or MXene clay whose solid content is 0.1 g was placed in the urea solution prepared in step (3), and the mixture was stirred on a hot stirrer for 30 minutes. The mixture was then allowed to stand, the solution was sampled with a 10 mL pipette, centrifuged with a centrifuge at 20,000 rpm for 10 minutes to precipitate the suspended MXene-containing sample, and 250 μL of the supernatant was sampled.

(5) Dropwise Addition of Assay Kit Solution

To the supernatant, added was 1250 μL of the assay kit solution prepared in step (2), and the mixture was allowed to stand for 50 minutes to obtain a sample for measuring absorbance.

(6) Measurement of Absorbance

First, a urea solution without addition of the MXene-containing sample, and two-fold dilution of such urea solution without addition of the MXene-containing sample, were obtained for preparation of a calibration curve. Absorbance of the individual solutions was measured to prepare the calibration curve. Next, the absorbance of the samples prepared in step (5) was measured, and the measured values of absorbance were fitted on the calibration curve, to determine the concentration of urea remained unadsorbed in the solution. From the urea concentration, the amount (in mg) of urea adsorbed per 1 g the MXene-containing sample was calculated. Results are summarized in Table 1.

[Calculation of Safety Factor]

The amount of urea removable by a single run of artificial dialysis is approximately 6 g on average, so that the amount of adsorbent (MXene-containing sample) necessary for removing 6 g of urea (denoted in Table 1 as "Adsorbent required") was estimated from the amount of urea adsorption of each sample. The amount (in g) of Li contained in the "Adsorbent required" was also calculated, and the blood Li level (mmol/L) was estimated, assuming that Li in MXene is entirely eluted into blood (of adult male weighing 60 kg, with an average blood volume of 5 L). On the other hand, the allowable upper limit of the blood Li level is considered to be 1.5 mmol/L. The safety factor was therefore estimated by dividing the upper limit of blood Li level, by the thus estimated blood Li level.

The adsorption performance was determined in terms of the amount of urea adsorption, rated as good (o) at 30 mg/g or above; rated as the prior level (4) at 10 mg/g or above, and below 30 mg/g; and rated as poor (x) at below 10 mg/g. Biocompatibility was determined in terms of the safety factor, rated as good (o) at 5.0 (fold) or above; rated as the prior level (4) at 3.0 (fold) or above, and below 5.0 (fold); and rated as poor (x) at below 3.0 (fold). Those that excel both in the adsorption performance and the biocompatibility were rated overall as good (o); and the other cases were rated overall as poor (x). Results are summarized in Table 1.

for the suction filtration was a membrane filter (Durapore, from Merck KGaA, pore size=0.45 μm).

Figure 4:
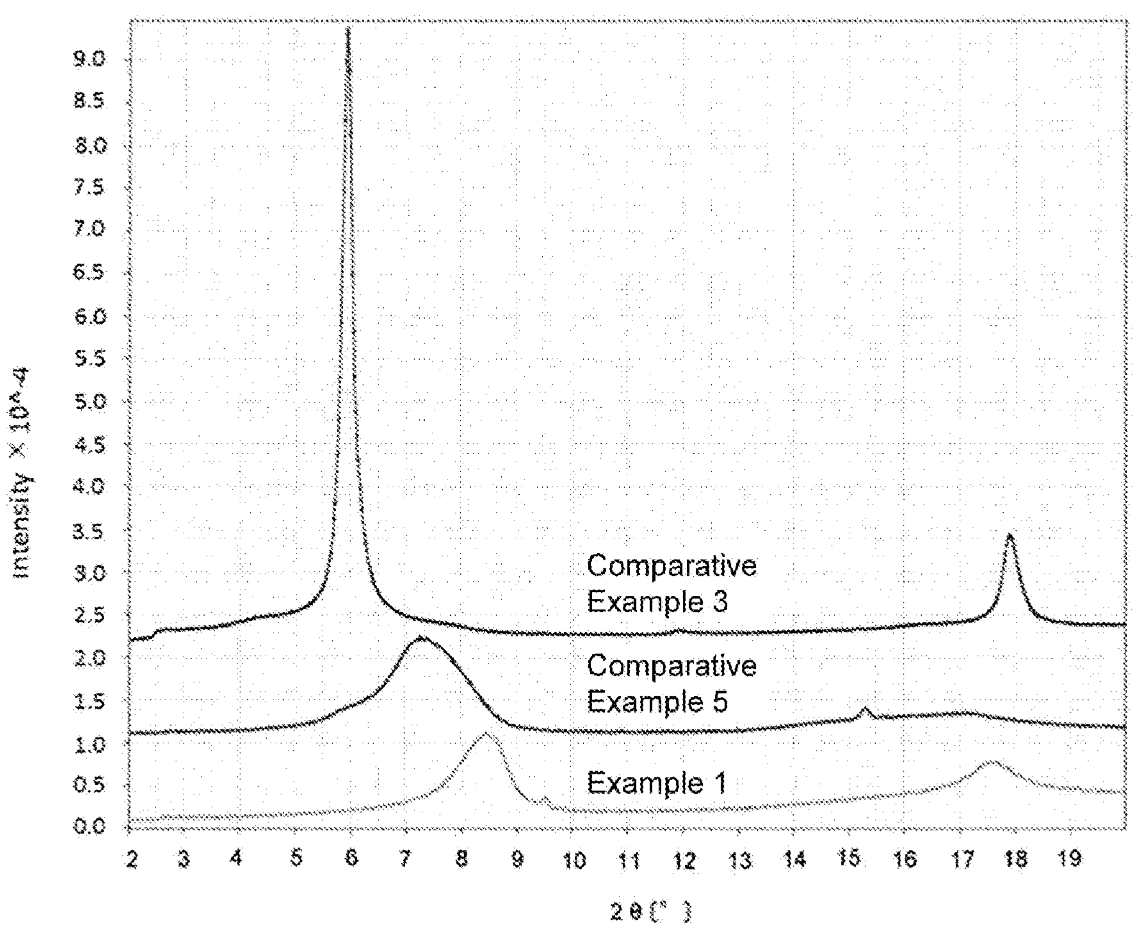
FIG. 4 is a chart illustrating results of X-ray diffractometry in Examples.

XRD measurement was conducted under the conditions below, to obtain a two-dimensional X-ray diffraction image of the MXene films. Results are illustrated in FIG. 4.

(XRD Measurement Conditions)

Apparatus: MiniFlex 600, from Rigaku Corporation Conditions

X-ray source: Cu tube

Characteristic X-ray: CuKα=1.54 Å

Measurement range: 3° to 20°

Step: 50 steps/°

Sample: Filtration film

In FIG. 4, the more the peak appears on the low-angle side, or, the more the peak appears on the left side on the X-axis, the wider the interlayer distance will be. FIG. 4 teaches that Example 1 demonstrated the smallest interlayer distance, meanwhile Comparative Example 3 and Comparative Example 5 demonstrated the interlayer distance larger than that in Example 1. Comparative Example 3, although without Li contained therein, demonstrated a large interlayer distance supposedly because TMA (organic dispersant) derived from TMAOH was included. Comparative Example 5, having the Li content not controlled therein, demonstrated a large interlayer distance, supposedly because Li resides between the layers of MXene.

The results of measurement teach that MXene that constitutes the adsorbent of this embodiment was considered to be the monolayer/less-layered MXene having a sufficiently large surface area, since MXene was subjected to Li intercalation, followed by delamination for converting it into monolayer one. The adsorbent with MXene having a sufficiently large surface area, typically used in artificial dialysis, can therefore fully adsorb and remove urea, as compared with Comparative Examples 1 and 4 that use multilayer MXene.

TABLE 1

| Sample | Li content (wt %) | Amount of urea adsorption (mg/g) | Adsorbent required (g) | Blood Li level (mmol/L) | Safety factor | Adsorption performance | Biocompatibility | Overall |
|---|---|---|---|---|---|---|---|---|
| Example 1 | 0.0004 | 57.2 | 105 | 0.012 | 124.05 | ○ | ○ | ○ |
| Example 2 | 0.0001 | 61.3 | 98 | 0.003 | 531.78 | ○ | ○ | ○ |
| Example 3 | 0.0010 | 59.4 | 101 | 0.029 | 51.53 | ○ | ○ | ○ |
| Example 4 | 0.0020 | 62.8 | 96 | 0.055 | 27.24 | ○ | ○ | ○ |
| Comparative Example 1 | — | 9.7 | 619 | — | — | × | ○ | × |
| Comparative Example 2 | 0.0035 | 18.4 | 326 | 0.329 | 4.56 | Δ | Δ | × |
| Comparative Example 3 | — | 0.0 | — | — | — | × | × | × |
| Comparative Example 4 | — | 8.7 | 690 | — | — | × | ○ | × |
| Comparative Example 5 | 0.4751 | 19.2 | 313 | 42.786 | 0.04 | Δ | × | × |

[Evaluation of Interlayer Distance]

The MXene-containing samples from Example 1, Comparative Example 3, and Comparative Example 5 were subjected to XRD measurement of the interlayer distance of MXene. For the XRD measurement, a filtration film (MXene film) was prepared for each of the individual examples. The filtration film (MXene film) was obtained by subjecting the MXene-containing clay or the MXene-containing slurry obtained in the individual examples, to suction filtration. After the filtration, the products were vacuum-dried at 80° C. for 24 hours, to produce MXene films. A filter used here The amount of urea adsorption in artificial dialysis was successfully increased, also supposedly because the Li intercalation followed by the acid treatment, conducted in the process of manufacturing the adsorbent, fully removed the intercalator (Li in this case) that remained after the Li intercalation. After going typically through the acid treatment, Li which is harmful to human body, in particular to kidney disease patient, was sufficiently suppressed as compared with those in Non-Patent Document 2 (Comparative Example 2) and Comparative Example 5. The Li content suppressed to 0.0020% by mass or below resulted in the safety factor, with respect to the upper limit value of the blood Li level, elevated to 27.2 times or above. Since the adsorbent does not contain TMAOH, which is harmful to human body and can inhibit urea adsorption as described in Non-Patent Document 3 (Comparative Example 3), this embodiment can provide the adsorbent that excels in urea adsorption performance and biocompatibility.

The adsorbent was also considered to increase the amount of urea adsorption, since the OH group which is likely to adsorb urea was reconstructed on the surface of MXene, while going through the acid treatment and the subsequent water washing in the process of manufacturing the adsorbent.

This application claims priority based on Japanese Patent Application No. 2021-013645, the content of which is incorporated herein by reference.

INDUSTRIAL APPLICABILITY

The adsorbent of the present disclosure is applicable to any of appropriate applications, and may be suitably used, for example, as a separation membrane for artificial dialyzer.

REFERENCE SIGNS LIST

1*a*, 1*b* Layer body ($M_mX_n$ layer)
3*a*, 5*a*, 3*b*, 5*b* Modifier or terminal T
7*a*, 7*b* MXene layer
10, 10*a*, 10*b* MXene particles (particles of layered material)
20 Titanium atom
21 Oxygen atom
40 Hemodialyzer
41 Blood inlet
42 Blood outlet
43 Blood pump
44 Blood purifier
45 Separation membrane
46 Blood transit area
47 Dialysate transit area
48 Fresh dialysate tank
49 Used dialysate tank
50 Dialysate pump

What is claimed is:

1. An adsorbent comprising:

a particle of a layered material that contains one or a plurality of layers; and Li, the one or the plurality of layers including a layer body represented by:

$$M_mX_n$$

where, M represents at least one Group-3, -4, -5, -6, or -7 metal,

X represents a carbon atom, a nitrogen atom, or a combination thereof, n is 1 to 4, and m is larger than n, and equal to or less than 5; and a modified/terminal part T resides on a surface of the layer body, and T represents at least one selected from the group consisting of hydroxy group, fluorine atom, chlorine atom, oxygen atom, and hydrogen atom, the particle has an average thickness of 1 nm to 10 nm, and the adsorbent has a Li content of 0.0001% by mass to 0.0020% by mass.

2. The adsorbent according to claim 1, wherein the adsorbent has a (002) plane peak in an X-ray diffractometry profile of the adsorbent at a 2θ angle of 8° or larger.

3. The adsorbent according to claim 1, wherein the adsorbent has a (002) plane peak in an X-ray diffractometry profile of the adsorbent at a 2θ angle of 8° to 9°.

4. The adsorbent according to claim 1, wherein the particle has an average maximum dimension, measured in a plane in parallel with the layer containing the particle, of 0.1 μm to 20 μm.

5. The adsorbent according to claim 1, further comprising one or more materials selected from ceramic, metal, and resin materials.

6. The adsorbent according to claim 1, wherein the adsorbent has a sheet form.

7. The adsorbent according to claim 1, wherein the adsorbent is constructed to adsorb a polar organic compound.

8. The adsorbent according to claim 1, wherein the adsorbent is constructed to adsorb a compound having either or both of hydroxy group and amino group, and ammonia.

9. The adsorbent according to claim 1, wherein the adsorbent is constructed to adsorb a uremic toxin.

10. The adsorbent according to claim 1, wherein the adsorbent is constructed to adsorb urea.

11. An adsorption sheet comprising the adsorbent according to claim 1.

12. An artificial dialysis membrane comprising the adsorbent according to claim 1.

13. An artificial dialyzer comprising the adsorbent according to claim 1.

14. A method for manufacturing an adsorbent, the method comprising:

(a) preparing a precursor represented by:

$$M_mAX_n$$

where, M represents at least one Group-3, -4, -5, -6, or -7 metal,

X represents a carbon atom, a nitrogen atom, or a combination thereof,

A represents at least one Group-12, -13, -14, -15, or -16 element, n is 1 to 4, and m is larger than n, and equal to or less than 5;

(b1) etching the precursor using an etching solution so as to remove at least a part of atoms A from the precursor to obtain an etched product;

(c1) washing the etched product with water to obtain a water-washed product;

(d1) conducting Li intercalation including a process of mixing the water-washed product with a Li-containing compound to obtain a Li-intercalated product;

(e) conducting delamination including a process of stirring the Li-intercalated product to obtain a delaminated product;

(f) conducting acid treatment including a process of mixing the delaminated product with an acid solution to obtain an acid-treated product; and (g) washing the acid-treated product with water to obtain the adsorbent, the adsorbent having a Li content of 0.0001% by mass to 0.0020% by mass.

15. A method for manufacturing the adsorbent according to claim 14, wherein the acid-treated product has a pH of 2.5 or less.

16. A method for manufacturing an adsorbent, the method comprising:

(a) preparing a precursor represented by:

$$M_mAX_n$$

where, M represents at least one Group-3, -4, -5, -6, or -7 metal,

X represents a carbon atom, a nitrogen atom, or a combination thereof,

A represents at least one Group-12, -13, -14, -15, or -16 element, n is 1 to 4, and m is larger than n, and equal to or less than 5;

(b2) etching the precursor using an etching solution that contains a Li-containing compound so as to remove at least a part of atoms A from the precursor concurrently with Li intercalation to obtain an etched-and-Li-intercalated product;

(c2) washing the etched-and-Li-intercalated product with water to obtain a water-washed product;

(e) conducting delamination including a process of stirring the water-washed product to obtain a delaminated product;

(f) conducting acid treatment including a process of mixing the delaminated product with an acid solution to obtain an acid-treated product; and (g) washing the acid-treated product with water to obtain the adsorbent, the adsorbent having a Li content of 0.0001% by mass to 0.0020% by mass.

17. A method for manufacturing the adsorbent according to claim 16, wherein the acid-treated product has a pH of 2.5 or less.

* * * * *